US012573552B2

(12) United States Patent
Oie

(10) Patent No.: US 12,573,552 B2
(45) Date of Patent: Mar. 10, 2026

(54) ELECTRONIC COMPONENT

(71) Applicant: Murata Manufacturing Co., Ltd.,
Kyoto (JP)

(72) Inventor: Hirofumi Oie, Nagaokakyo (JP)

(73) Assignee: Murata Manufacturing Co., Ltd.,
Kyoto (JP)

( * ) Notice: Subject to any disclaimer, the term of this
patent is extended or adjusted under 35
U.S.C. 154(b) by 189 days.

(21) Appl. No.: 18/411,124

(22) Filed: Jan. 12, 2024

(65) Prior Publication Data

US 2024/0194404 A1 Jun. 13, 2024

Related U.S. Application Data

(63) Continuation of application No.
PCT/JP2022/027041, filed on Jul. 8, 2022.

(30) Foreign Application Priority Data

Jul. 26, 2021 (JP) ................................. 2021-121734

(51) Int. Cl.
*H01G 2/24* (2006.01)
(52) U.S. Cl.
CPC ..................................... *H01G 2/24* (2013.01)
(58) Field of Classification Search
CPC .. H01G 2/24; H01G 4/30; H01F 27/00; Y10T
428/24479; Y10T 428/24612; Y10T
428/2462; Y10T 428/24802; Y10T
428/24942; Y10T 428/2495
USPC ............. 428/156, 172, 173, 195.1, 212, 213
See application file for complete search history.

(56) References Cited

U.S. PATENT DOCUMENTS

2018/0061551 A1     3/2018   Kondou et al.
2021/0098177 A1*    4/2021   Gibu ....................... H01F 27/29

FOREIGN PATENT DOCUMENTS

JP          H07-94357 A      4/1995
JP         2003-007573 A     1/2003
JP          2003297705 A  * 10/2003
JP         2004-031833 A     1/2004
JP          2007242806 A  *  9/2007
JP         2010-073961 A     4/2010
JP         2018-037516 A     3/2018

OTHER PUBLICATIONS

Machine translation of JP 2003-297705 Nakajima et al. Obtained
from EPO. (Year: 2003).*
International Search Report for PCT/JP2022/027041 dated Oct. 11,
2022.

* cited by examiner

*Primary Examiner* — Megha M Gaitonde
(74) *Attorney, Agent, or Firm* — McDonald Hopkins LLC

(57) ABSTRACT

To provide an electronic component capable of determining
a direction of the component based on a position of a mark
in an element body while enhancing visibility of the mark.
An electronic component includes an element body, a mark
formed on an principal surface of the element body, and a
recess is formed on the principal surface of the element
body. A part of the mark is formed in a part of the recess.
Therefore, when viewed from an orthogonal direction
orthogonal to the principal surface of the element body, a
part of the mark overlaps a part of the recess.

10 Claims, 13 Drawing Sheets

ELECTRONIC COMPONENT

CROSS REFERENCE TO RELATED APPLICATION

This is a continuation of International Application No. PCT/JP2022/027041 filed on Jul. 8, 2022 which claims priority from Japanese Patent Application No. 2021-121734 filed on Jul. 26, 2021. The contents of these applications are incorporated herein by reference in their entireties.

BACKGROUND OF THE DISCLOSURE

Field of the Disclosure

The present disclosure relates to an electronic component including an element body and a mark formed on an outer surface of the element body, and a method of manufacturing the electronic component.

Description of the Related Art

As an example of an electronic component including an element body and a mark formed on an outer surface of the element body, Patent Document 1 discloses a passive electronic component including a marker portion indicating a direction of the component.

In the passive electronic component disclosed in Patent Document 1, the direction of the component can be determined by forming the marker portion corresponding to the mark at a position shifted from a central portion of an outer surface of an insulator portion corresponding to the element body, or by forming the marker portion in an asymmetric shape such as a triangle.

Patent Document 1: JP-A-2018-37516

BRIEF SUMMARY OF THE DISCLOSURE

The mark is read by, for example, a camera or the like. In a case where the mark is formed at a position shifted from a central portion of the outer surface of the element body, the direction of the component is determined by reading the position of the mark. However, in a case where the mark is formed at the central portion of the outer surface of the element body, there is a possibility that the direction of the component cannot be determined at the position of the mark.

In a case where the mark has an asymmetric shape, even if the mark is formed at the central portion of the outer surface of the element body, the direction of the component can be determined by reading the shape of the mark. However, reading the shape of the mark requires higher reading accuracy than reading the position of the mark. Therefore, it is desirable to determine the direction of the component by reading the position of the mark rather than determining the direction of the component by reading the shape of the mark.

Furthermore, in a case where a size of the element body is small, a space in which the mark is formed is limited. Furthermore, the mark may interfere with an electrode or the like formed on the element body. In order to solve these problems, it is conceivable to reduce a size of the mark. However, by reducing the size of the mark, the visibility of the mark may be reduced.

Therefore, a possible benefit of the present disclosure is to solve the above problems, and to provide an electronic component capable of determining a direction of the component based on a position of a mark in an element body while enhancing visibility of the mark.

In order to achieve the above possible benefit, the present disclosure is configured as follows. An electronic component according to one aspect of the present disclosure includes: an element body; and a mark formed on an outer surface of the element body, in which a recess is formed on the outer surface of the element body, and a part of the mark is formed in the recess.

According to the present disclosure, it is possible to determine the direction of the component based on the position of the mark in the element body while enhancing the visibility of the mark.

DETAILED DESCRIPTION OF THE DISCLOSURE

Figure 1:
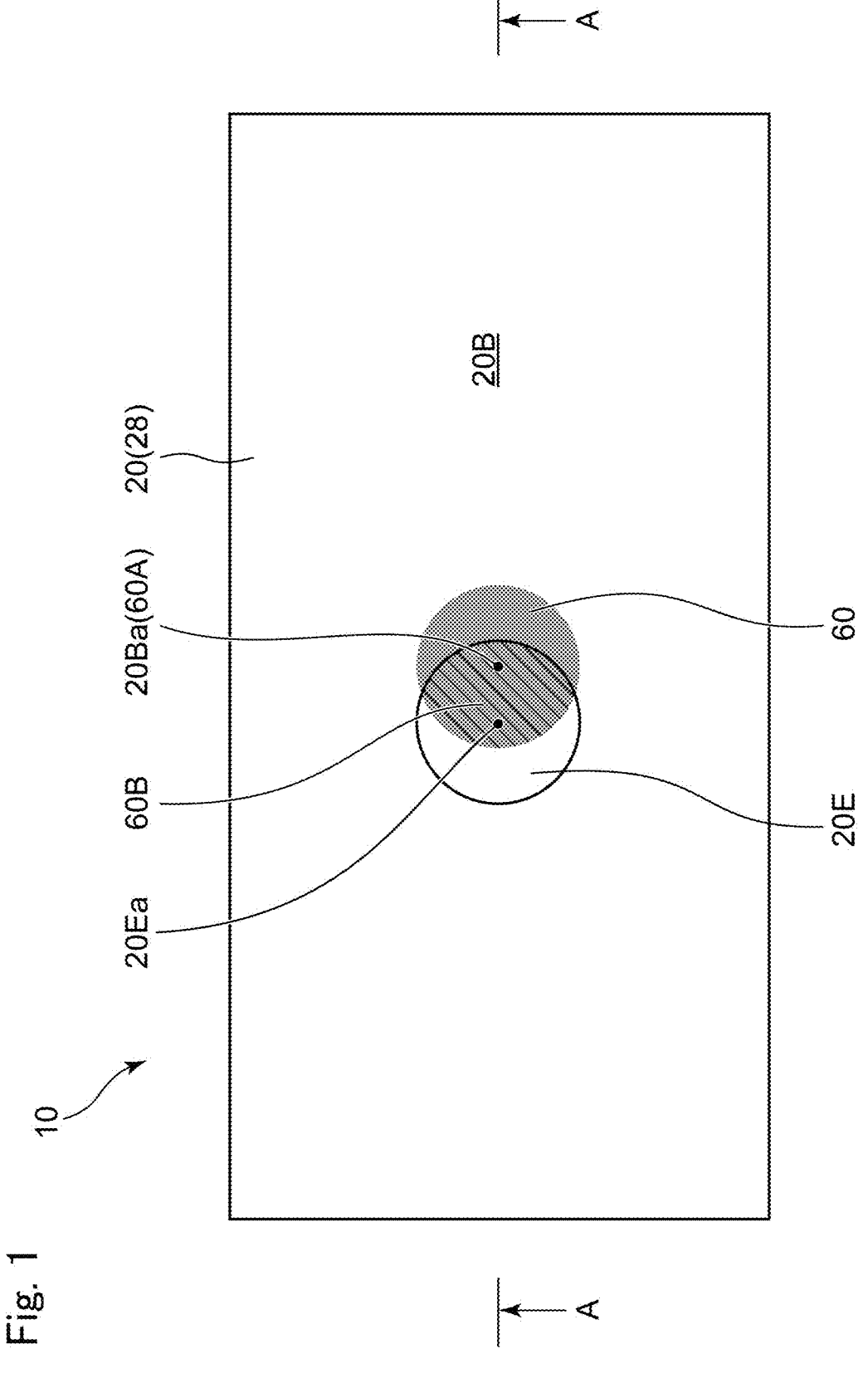
FIG. 1 is a plan view of an electronic component according to an embodiment of the present disclosure.

An electronic component according to one aspect of the present disclosure includes: an element body; and a mark formed on an outer surface of the element body, in which a recess is formed on the outer surface of the element body, and a part of the mark is formed in the recess.

According to this configuration, a part of the mark is formed in the recess. Therefore, a part of the mark and a portion other than the part of the mark can have different depths. As a result, the appearance of the mark can be changed according to each position in the mark. For example, when light is applied to the mark, a position corresponding to the recess in the mark looks darker than a position corresponding to a portion other than the recess in the mark. Due to this difference in appearance, the mark can be recognized as non-rotationally symmetric in a case where elements other than the shape such as brightness, color, and pattern are included. As a result, a direction of the electronic component can be determined based on the position of the mark.

According to this configuration, a part of the mark is formed in the recess. Therefore, when light is applied to the mark, a position corresponding to the recess in the mark looks darker than a position corresponding to a portion other than the recess in the mark. As a result, a shading difference occurs between a position corresponding to the recess in the mark and a position not corresponding to the recess in the mark. As a result, the visibility of the mark can be enhanced.

In the electronic component, when viewed from an orthogonal direction orthogonal to the outer surface of the element body, a portion of the mark formed in the recess may be asymmetric with respect to a center point of rotational symmetry of the mark.

In a case where a portion of the mark formed in the recess is symmetric with respect to the center point of rotational symmetry of the mark when viewed from the orthogonal direction, the mark cannot be recognized as non-rotationally symmetric even due to a difference in appearance between a position corresponding to the recess in the mark and a position corresponding to a portion other than the recess in the mark. However, according to this configuration, the portion of the mark formed in the recess is asymmetric with respect to the center point of rotational symmetry of the mark. Therefore, the mark can be recognized as non-rotationally symmetric in a case where elements other than the shape such as brightness, color, and pattern are included.

In the electronic component, a shape of the mark may be different from a shape of the recess when viewed from an orthogonal direction orthogonal to the outer surface of the element body.

According to this configuration, compared to a configuration in which the shape of the mark and the shape of the recess are the same when viewed from the orthogonal direction, the difference between the portion formed in the recess and the portion formed a portion other than the recess in the mark can be made clearer. Accordingly, the visibility of the mark can be enhanced.

In the electronic component, when viewed from an orthogonal direction orthogonal to the outer surface of the element body, the recess may be formed across a portion where the mark is formed in the outer surface of the element body and a portion where the mark is not formed in the outer surface of the element body.

According to this configuration, the recess can be made larger than the configuration in which the recess is formed only in the portion where the mark is formed. Thus, it is easy to form the recess in the element body.

In the electronic component, when viewed from an orthogonal direction orthogonal to the outer surface of the element body, the recess may be formed only in a portion where the mark is formed in the outer surface of the element body.

According to this configuration, the recess is not formed outside the mark. As a result, in the electronic component, the portion for forming the mark and the portion for forming the recess can be made common. Therefore, the electronic component can be downsized.

In the electronic component, a plurality of the recesses may be formed on the outer surface of the element body.

When light is applied to the mark, a position corresponding to the recess in the mark looks darker than a position corresponding to a portion other than the recess in the mark. According to this configuration, the plurality of recesses are formed on the outer surface of the element body. Therefore, a plurality of dark-looking places in the mark are formed. As a result, a large number of light-dark boundary portions can be formed in the mark. As a result, the visibility of the mark can be enhanced.

In the electronic component, a depth of the recess along an orthogonal direction orthogonal to the outer surface of the element body may be a thickness or more of the mark along the orthogonal direction orthogonal to the outer surface of the element body.

When light is applied to the mark formed in the recess, the mark formed in the recess looks darker as the recess is deeper. According to this configuration, the depth of the recess along the orthogonal direction is the thickness or more of the mark along the orthogonal direction. Therefore, the visibility of the mark can be enhanced compared to a configuration in which the depth of the recess along the orthogonal direction is smaller than the thickness of the mark along the orthogonal direction.

In the electronic component, the mark may have a rotationally symmetric shape when viewed from an orthogonal direction orthogonal to the outer surface of the element body, the outer surface of the element body may have a rotationally symmetric shape when viewed from the orthogonal direction orthogonal to the outer surface of the element body, and a center point of a rotational symmetry of the mark may coincide or substantially coincide with a center point of a rotational symmetry of the outer surface of the element body when viewed from the orthogonal direction orthogonal to the outer surface of the element body.

Even in a configuration in which the outer surfaces of the mark and the element body have a rotationally symmetric shape when viewed from the orthogonal direction, and the center point of the rotational symmetry of the mark coincides with or substantially coincides with the center point of the rotational symmetry of the outer surface of the element body when viewed from the orthogonal direction, the following effects are obtained. As described above, a mark having a rotationally symmetric shape can be recognized as being non-rotationally symmetric in elements other than the shape such as brightness, color, or pattern depending on a difference in appearance when light is applied. As a result, the direction of the electronic component can be determined based on the position of the mark in the element body.

In the electronic component, the element body may be made of ceramic.

Embodiment

Figure 2:
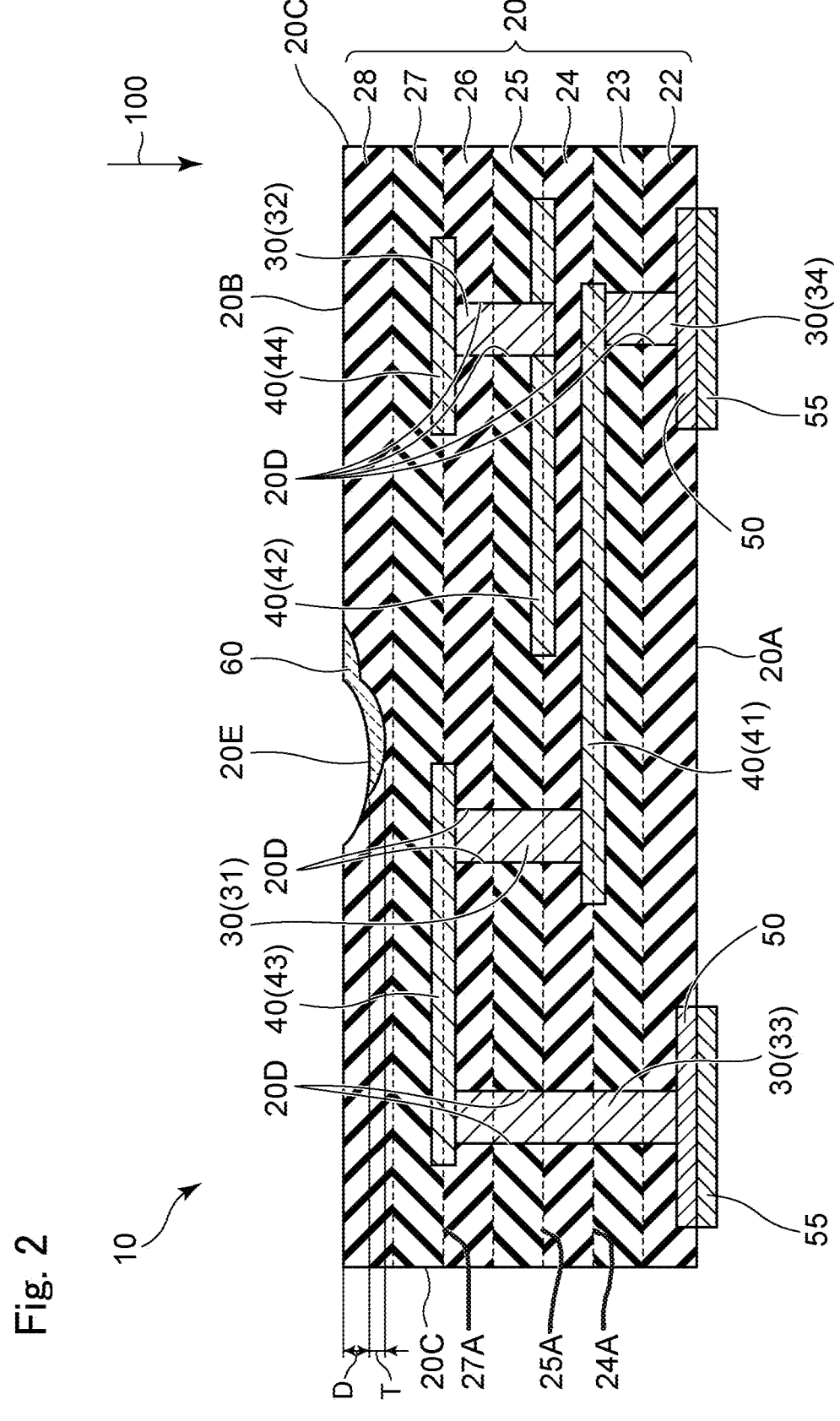
FIG. 2 is a cross-sectional view illustrating a cross section taken along line A-A in FIG. 1.

FIG. 1 is a plan view of an electronic component according to an embodiment of the present disclosure. FIG. 2 is a cross-sectional view illustrating an A-A cross section of FIG. 1. In the electronic component, a mark is provided on an element body. In the electronic component according to the present embodiment, an internal conductor and an external electrode are provided on the element body in addition to the mark. The electronic component can be mounted on a mother substrate or the like via the external electrode.

As illustrated in FIGS. 1 and 2, an electronic component 10 according to the present embodiment includes an element body 20, an interlayer connection conductor 30, an internal electrode 40, an external electrode 50, a plating layer 55, and an identification mark 60. The identification mark 60 is an example of the mark.

The element body 20 has a rectangular parallelepiped shape as a whole. The shape of the element body 20 is not limited to a rectangular parallelepiped shape. In the present embodiment, the element body 20 is formed by integrating laminated base materials 22 to 28. Note that the number of base materials constituting the element body 20 is not limited to seven. Each of the base materials 22 to 28 is insulating and has a plate shape. In the present embodiment, the element body 20 (each of the base materials 22 to 28) is made of low temperature co-fired ceramics (LTCC). The element body 20 is not limited to LTCC, and may be made of ceramic other than LTCC such as alumina, or may be made of resin such as glass epoxy, Teflon (registered trademark), or paper phenol. In the case of the present embodiment, since the element body 20 is a sintered body of the same material, there is no interface between the base materials 22 to 28. In FIG. 2, broken lines are drawn between the base materials 22 to 28 for convenience of description. Note that in a case where the element body 20 is formed by laminating different materials, an interface may remain at a position indicated by the broken line in FIG. 2.

As illustrated in FIG. 2, the element body 20 includes principal surfaces 20A and 20B and a side surface 20C. The principal surface 20A is a principal surface of the base material 22 and faces the outside of the element body 20. The principal surface 20B is a principal surface of the base material 28 and faces the outside of the element body 20. The principal surface 20B faces opposite to the principal surface 20A. The side surface 20C is configured by a side surface of the base materials 22 to 28. The side surface 20C connects the principal surfaces 20A and 20B.

A plan view of FIG. 1 is a view of the electronic component 10 as viewed in an orthogonal direction 100 (see FIG. 2). The orthogonal direction 100 is a direction orthogonal to the principal surface 20B of the element body 20. In other words, the orthogonal direction 100 is a direction orthogonal to the identification mark 60. As illustrated in FIG. 1, the principal surface 20B of the element body 20 is rectangular when viewed from the orthogonal direction 100. That is, in the present embodiment, when viewed from the orthogonal direction 100, the principal surface 20B of the element body 20 has a rotationally symmetric shape with a rotation center as a center point 20Ba. The principal surface 20B of the element body may have a non-rotationally symmetric shape when viewed from the orthogonal direction 100, for example, a T shape when viewed from the orthogonal direction 100.

As illustrated in FIGS. 1 and 2, a recess 20E is formed in the principal surface 20B of the element body 20. The recess 20E is formed on a surface on which the identification mark 60 is formed. In the present embodiment, as will be described later, the identification mark 60 is formed on the principal surface 20B of the element body 20. Therefore, the recess 20E is formed in the principal surface 20B of the element body 20. The surface on which the recess 20E is formed corresponds to the outer surface of the element body. That is, in the present embodiment, the principal surface 20B of the element body 20 corresponds to the outer surface of the element body.

The recess 20E may be formed on a portion other than the principal surface 20B of the element body. For example, in a case where the identification mark 60 is formed on the principal surface 20A of the element body 20, the recess 20E is formed on the principal surface 20A of the element body. Furthermore, for example, in a case where the identification marks 60 are formed on both the principal surfaces 20A and 20B of the element body 20, the recesses 20E may be formed on both the principal surfaces 20A and 20B of the element body, or the recess 20E may be formed on one of the principal surfaces 20A and 20B of the element body 20. That is, in a case where the electronic component 10 includes the identification mark 60 on each of the plurality of surfaces, the recess 20E is formed on at least one of the plurality of surfaces.

The recess 20E has a spherical shape. In other words, a surface constituting the recess 20E is a spherical surface. That is, as illustrated in FIG. 1, the recess 20E has a circular shape when viewed from the orthogonal direction 100. However, the shape of the recess 20E is not limited to a spherical shape. For example, the recess 20E may have a rectangular parallelepiped shape. In this case, the recess 20E has a rectangular shape when viewed from the orthogonal direction 100.

As illustrated in FIG. 2, the interlayer connection conductor 30 is formed inside the element body 20. The interlayer connection conductor 30 can be formed on at least one of the base materials 22 to 28. In the present embodiment, the interlayer connection conductor 30 is formed on the base materials 22 to 26.

The interlayer connection conductor 30 is formed by filling a through hole 20D extending through at least one of the plurality of base materials 22 to 28 in a thickness direction of the base materials 22 to 28 with a conductive paste and co-firing the paste with a ceramic (LTCC in the present embodiment). The conductive paste contains, for example, a conductive powder such as copper. The conductive powder contained in the conductive paste is not limited to copper, and may be, for example, silver. In a case where the element body 20 is made of resin, the interlayer connection conductor 30 is formed by plating a conductive metal made of copper or the like. In the present embodiment, since the through hole 20D has a cylindrical shape, the interlayer connection conductor 30 has a cylindrical shape. The shape of the through hole 20D is not limited to the cylindrical shape, and may be, for example, a shape such as a quadrangular prism.

In FIG. 2, the interlayer connection conductor 30 includes four interlayer connection conductors 31 to 34. The interlayer connection conductor 31 is filled in the through hole 20D extending through the base materials 24 to 26. The interlayer connection conductor 32 is filled in the through hole 20D extending through the base materials 25 and 26. The interlayer connection conductor 33 is filled in the through hole 20D extending through the base materials 22 to 26. The interlayer connection conductor 34 is filled in the through hole 20D extending through the base materials 22 and 23. The number of the interlayer connection conductors 30 is not limited to four. A length of each of the interlayer connection conductors 31 to 34 (the number of penetrated base materials) in the thickness direction is not limited to the length described above.

The internal electrode 40 is formed inside the element body 20 and is not exposed to the outside of the element body 20. The internal electrode 40 can be formed on at least one of the base materials 22 to 28. In the present embodiment, the internal electrode 40 is formed on a principal surface 24A of the base material 24, a principal surface 25A of the base material 25, and a principal surface 27A of the base material 27.

In a case where the element body 20 is made of ceramic as in the present embodiment, the internal electrode 40 is formed by printing a conductive paste on a principal surface (in the present embodiment, the principal surfaces 24A, 25A, and 27A) of the base material and co-firing the paste with the base material. The conductive paste is made of, for example, copper or silver. In a case where the element body 20 is made of resin, the internal electrode 40 is formed on the principal surface of the base material by a known means such as etching a metal foil.

In FIG. 2, the internal electrode 40 includes four internal electrodes 41 to 44. The internal electrode 41 is formed on the principal surface 24A of the base material 24. The internal electrode 42 is formed on the principal surface 25A of the base material 25. The internal electrodes 43 and 44 are formed on the principal surface 27A of the base material 27.

Each of the internal electrodes 40 is electrically connected to the other internal electrode 40 and the external electrode 50 via the interlayer connection conductor 30. In the present embodiment, the internal electrodes 41 and 43 are electrically connected to each other via the interlayer connection conductor 31. Furthermore, the internal electrodes 42 and 44 are electrically connected to each other via the interlayer connection conductor 32. Furthermore, each of the internal electrodes 41 and 43 is electrically connected to the external electrode 50 described later via the interlayer connection conductors 33 and 34.

The external electrode 50 is formed outside the element body 20. That is, the external electrode 50 is exposed to the outside of the element body 20. In the present embodiment, the external electrode 50 is formed on the principal surface of the base material 22, that is, the principal surface 20A of the element body 20. Note that the external electrode 50 may be formed on the principal surface of the base material 28, that is, the principal surface 20B of the element body 20.

The external electrode 50 is configured in the same manner as the internal electrode 40. That is, in the present embodiment, the external electrode 50 is obtained by printing a conductive paste on the principal surface 20A of the element body 20 and co-firing the paste with the base materials 22 to 28. In the present embodiment, the electronic component 10 includes two external electrodes 50. As described above, each of the external electrodes 50 is electrically connected to each of the internal electrodes 41 and 43.

The plating layer 55 covers the external electrode 50. The plating layer 55 suppresses the influence of atmosphere, moisture, and the like on the external electrode 50. The plating layer 55 is, for example, a film made of Ni—Sn, Ni-electroless Au, or the like. In FIG. 2, two plating layers 55 are drawn, but the number of plating layers 55 included in the electronic component 10 is not limited to two.

The identification mark 60 is formed on the element body 20. The identification mark 60 is for indicating an attitude and a direction of the electronic component 10. In the present embodiment, the identification mark 60 is formed on the principal surface 20B of the element body 20 which is an outer surface of the element body 20. Note that the identification mark 60 may be formed on another outer surface of the element body 20, for example, the principal surface 20A of the element body. Furthermore, in the present embodiment, the electronic component 10 includes one identification mark 60, but may include a plurality of the identification marks 60. Furthermore, in each drawing, the color of the identification mark 60 is illustrated in gray, but the color of the identification mark 60 is not limited to gray, and may be other colors such as black and red.

In the present embodiment, the identification mark 60 enters the element body 20. Note that an outer surface of the identification mark 60 may not enter the element body 20. For example, the identification mark 60 may protrude from the principal surface 20B of the element body 20 by only a part thereof entering the element body 20.

The identification mark 60 is made of a material different from that of the element body 20. In the present embodiment, the identification mark 60 is made of a non-conductive inorganic material (for example, ceramic).

Note that the identification mark 60 is not limited to ceramic, and may be made of, for example, resin or a conductive member (for example, metal such as copper or silver). Furthermore, the visibility of the identification mark 60 may be improved by making the ceramic different in color from the element body 20. For example, oxide ceramics such as alumina, zirconia, and cobalt may be mixed to change the color. Furthermore, the identification mark 60 may be made of a plurality of types of materials. For example, the identification mark 60 may be made of a main material having the highest ratio among constituent materials and at least one other material having a ratio lower than that of the main material. In this case, for example, glass, a component close to LTCC which is the material of the element body 20, or the like is added to the main material of the identification mark 60 as the other material of the identification mark 60.

As illustrated in FIG. 1, the identification mark 60 has a circular shape when viewed from the orthogonal direction 100. That is, in the present embodiment, when viewed from the orthogonal direction 100, the identification mark 60 has a rotationally symmetric shape with a rotation center as a center point 60A. Furthermore, in the present embodiment, when viewed from the orthogonal direction 100, the center point 60A of rotational symmetry of the identification mark 60 coincides with the center point 20Ba of rotational symmetry of the principal surface 20B of the element body 20. The shape of the identification mark 60 viewed from the orthogonal direction 100 is not limited to a circular shape, and may be, for example, a quadrangular shape.

Note that the center point 60A of rotational symmetry of the identification mark 60 and the center point 20Ba of rotational symmetry of the principal surface 20B of the element body 20 do not need to completely coincide with each other when viewed from the orthogonal direction 100. For example, the two center points 60A and 20Ba may be different by an error at the time of forming the identification mark 60 and a tolerance of the element body 20. That is, the two center points 60A and 20Ba may substantially coincide with each other when viewed from the orthogonal direction 100.

In the present embodiment, as viewed from the orthogonal direction 100, the recess 20E of the element body 20 has a circular shape as described above. Furthermore, when viewed from the orthogonal direction 100, the recess 20E of the element body 20 has the same size as the identification mark 60.

When viewed from the orthogonal direction 100, a center point 20Ea of the recess 20E is at a position different from the center point 60A of rotational symmetry of the identification mark 60. That is, the recess 20E is formed at a position shifted from the identification mark 60. As a result, a part of the identification mark 60 overlaps a part of the recess 20E of the element body 20 when viewed from the orthogonal direction 100. That is, a part of the identification mark 60 is formed in the recess 20E of the element body 20. In other words, when viewed from the orthogonal direction 100, the recess 20E of the element body 20 is formed across a portion where the identification mark 60 is formed in the principal surface 20B of the element body 20 and a portion where the identification mark 60 is not formed in the principal surface 20B of the element body 20.

With the above-described configuration, when viewed in the orthogonal direction 100, a portion (FIG. 1 illustrates a hatched portion, which will be referred to as an overlapping portion 60B below.) of the identification mark 60 formed in the recess 20E is asymmetric with respect to the center point 60A of rotational symmetry of the identification mark 60.

As illustrated in FIG. 2, a depth D of the recess 20E along the orthogonal direction 100 is larger than a thickness T of the identification mark 60 along the orthogonal direction 100. In a case where the depth of the recess 20E along the orthogonal direction 100 is different at each position in the recess 20E, the depth D of the recess 20E is the maximum depth among the depths at the respective positions. In a case where a thickness of the identification mark 60 along the orthogonal direction 100 is different at each position in the identification mark 60, the thickness T of the identification mark 60 is the maximum thickness among the thicknesses at the respective positions. For example, in the present embodiment, the depth D is 6 to 7 ($\mu$m) and the thickness T is 5 ($\mu$m). Of course, the depth D and the thickness T are not limited to the above values.

Note that the depth D of the recess 20E along the orthogonal direction 100 may be the same as the thickness T of the identification mark 60 along the orthogonal direction 100, or may be smaller than the thickness T of the identification mark 60 along the orthogonal direction 100.

According to the present embodiment, a part of the identification mark 60 is formed in the recess 20E. Therefore, a part of the identification mark 60 and a portion other than the part of the identification mark 60 can have different depths. As a result, the appearance of the identification mark 60 can be changed according to each position in the identification mark 60. For example, when light is applied to the identification mark 60, a position corresponding to the recess 20E in the identification mark 60 looks darker than a position corresponding to a portion other than the recess 20E in the identification mark 60. Due to this difference in appearance, the identification mark 60 can be recognized as being non-rotationally symmetric in a case where elements other than the shape such as brightness, color, and pattern are included. As a result, the direction of the electronic component 10 can be determined based on the position of the identification mark 60.

According to the present embodiment, a part of the identification mark 60 is formed in the recess 20E. Therefore, when light is applied to the identification mark 60, the position corresponding to the recess 20E in the identification mark 60 looks darker than the position corresponding to the portion other than the recess 20E in the identification mark 60. As a result, a shading difference occurs between a position corresponding to the recess 20E in the identification mark 60 and a position not corresponding to the recess 20E in the identification mark 60. As a result, the visibility of the identification mark 60 can be enhanced.

In a case where a portion of the identification mark 60 formed in the recess 20E is symmetric with respect to the center point 60A of rotational symmetry of the identification mark 60 as viewed from the orthogonal direction 100, the identification mark 60 cannot be recognized as being non-rotationally symmetric even due to a difference in appearance between a position corresponding to the recess 20E in the identification mark 60 and a position corresponding to other than the recess 20E in the identification mark 60. For example, in a case where the center point 20Ea of the recess 20E coincides with the center point 60A of rotational symmetry of the identification mark 60, a portion of the identification mark 60 formed in the recess 20E is symmetric with respect to the center point 60A of rotational symmetry of the identification mark 60. However, according to the present embodiment, the portion of the identification mark 60 formed in the recess 20E is asymmetric with respect to the center point 60A of rotational symmetry of the identification mark 60. Therefore, the identification mark 60 can be recognized as being non-rotationally symmetric in a case where elements other than the shape such as brightness, color, and pattern are included.

According to the present embodiment, when viewed from the orthogonal direction 100, the recess 20E is formed across a portion where the identification mark 60 is formed in the principal surface 20B of the element body 20 and a portion where the identification mark 60 is not formed in the principal surface 20B of the element body 20. Therefore, the recess 20E can be made larger than a configuration in which the recess 20E is formed only in the portion where the identification mark 60 is formed. As a result, it is easy to form the recess 20E in the element body 20.

When light is applied to the identification mark 60 formed in the recess 20E, the deeper the recess 20E is, the darker the identification mark 60 formed in the recess 20E looks. According to the present embodiment, the depth D of the recess 20E along the orthogonal direction 100 is larger than the thickness T of the identification mark 60 along the orthogonal direction 100. Therefore, the visibility of the identification mark 60 can be enhanced compared to a configuration in which the depth D of the recess 20E along the orthogonal direction 100 is smaller than the thickness T of the identification mark 60 along the orthogonal direction 100.

Even in a configuration in which the identification mark 60 and the principal surface 20B of the element body 20 have a rotationally symmetric shape when viewed from the orthogonal direction 100, and the center point 60A of the rotational symmetry of the identification mark 60 coincides with or substantially coincides with the center point 20Ba of the rotational symmetry of the principal surface 20B of the element body 20 when viewed from the orthogonal direction 100, the following effects are obtained. That is, as described above, the identification mark 60 having a rotationally symmetric shape can be recognized as being non-rotationally symmetric in elements other than the shape such as brightness, color, and pattern depending on the difference in appearance when light is applied. As a result, the direction of the electronic component 10 can be determined based on the position of the identification mark 60 in the element body 20.

In the present embodiment, when viewed in the orthogonal direction 100, an area of the overlapping portion 60B (hatched portion in FIG. 1) where the identification mark 60 and the recess 20E overlap is in a range of 30% to 70% of an area of the identification mark 60. That is, in the present embodiment, a lower limit of a ratio of the area of the overlapping portion 60B to the area of the identification mark 60 when viewed from the orthogonal direction 100 is 30% of the area of the identification mark 60. Furthermore, in the present embodiment, an upper limit of the ratio of the area of the overlapping portion 60B to the area of the identification mark 60 when viewed from the orthogonal direction 100 is 70% of the area of the identification mark 60.

Note that the lower limit is not limited to 30%, and the upper limit is not limited to 70%. The lower limit and the upper limit may be different values depending on the size, shape, and the like of the identification mark 60. For example, the lower limit may be lower than 30% (e.g., 20%) or higher than 30% (e.g., 40%). Furthermore, for example, the upper limit may be higher than 70% (for example, 80%) or lower than 70% (for example, 60%).

In a case where the lower limit is lower than an appropriate value (for example, 30%), the area of the overlapping portion 60B viewed from the orthogonal direction 100 is too small, and the effect of improving the visibility of the overlapping portion 60B with respect to the other portion other than the overlapping portion 60B in the identification mark 60 is not sufficiently exhibited. The visibility improvement effect is, for example, that when light is applied to the identification mark 60, the overlapping portion 60B looks darker than the other portion, thereby improving the visibility of the identification mark 60. Furthermore, in a case where the lower limit is lower than the appropriate value, the area of the overlapping portion 60B viewed from the orthogonal direction 100 is too small, and there is a possibility that it is not possible to sufficiently determine the shape of the overlapping portion 60B with respect to the other portion.

In a case where the upper limit is higher than an appropriate value (for example, 70%), the identification mark 60 looks dark as a whole, so that a shading difference with respect to a portion other than the identification mark 60 becomes clear, and visibility of the identification mark 60 as a whole is improved. However, since the area of the overlapping portion 60B viewed from the orthogonal direction 100 is too large with respect to the area of the other portion, there is a possibility that the shape of other portion with respect to the overlapping portion 60B cannot be sufficiently determined.

Figure 3:
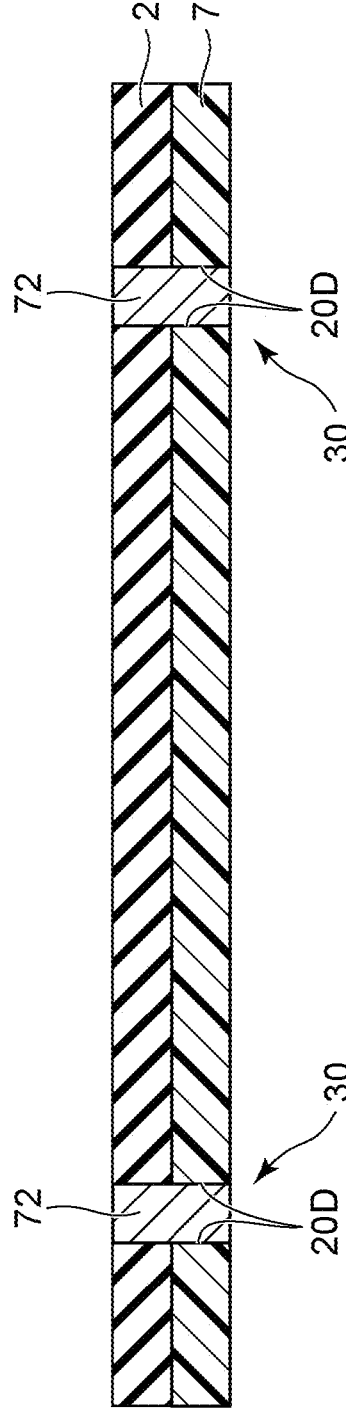
FIG. 3 is a cross-sectional view when an interlayer connection conductor is formed on a base material in a method of manufacturing an electronic component according to the embodiment of the present disclosure.
Figure 4:
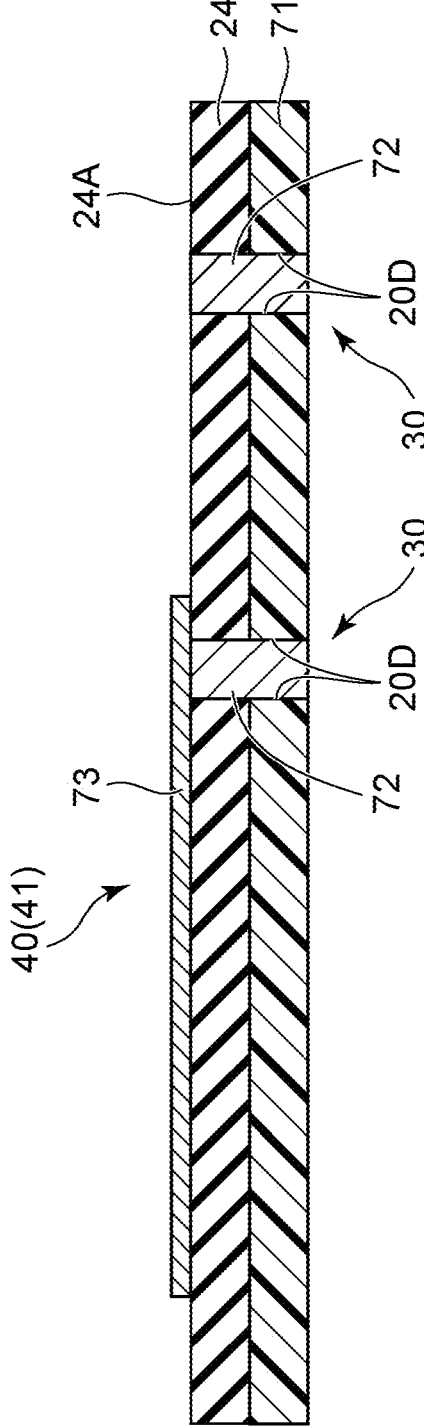
FIG. 4 is a cross-sectional view when an internal electrode is printed on the base material in the method of manufacturing an electronic component according to the embodiment of the present disclosure.
Figure 5:
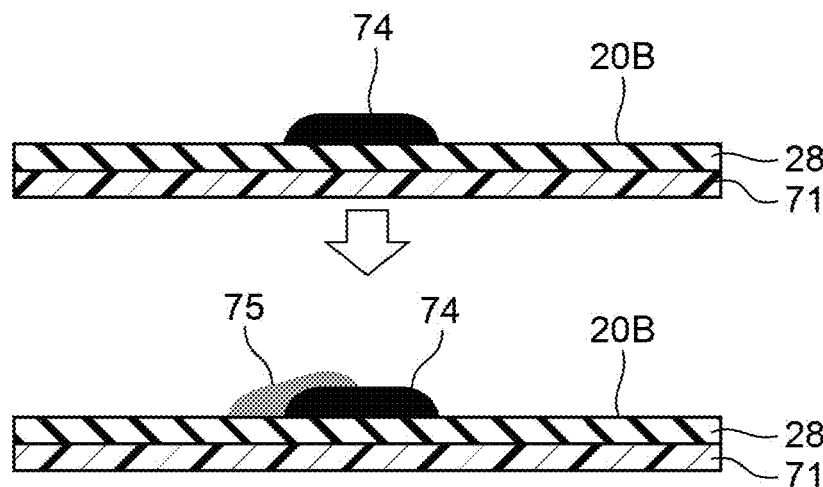
FIG. 5 is a cross-sectional view illustrating a process in which a mark is printed on the base material in the method of manufacturing an electronic component according to the embodiment of the present disclosure.
Figure 6:
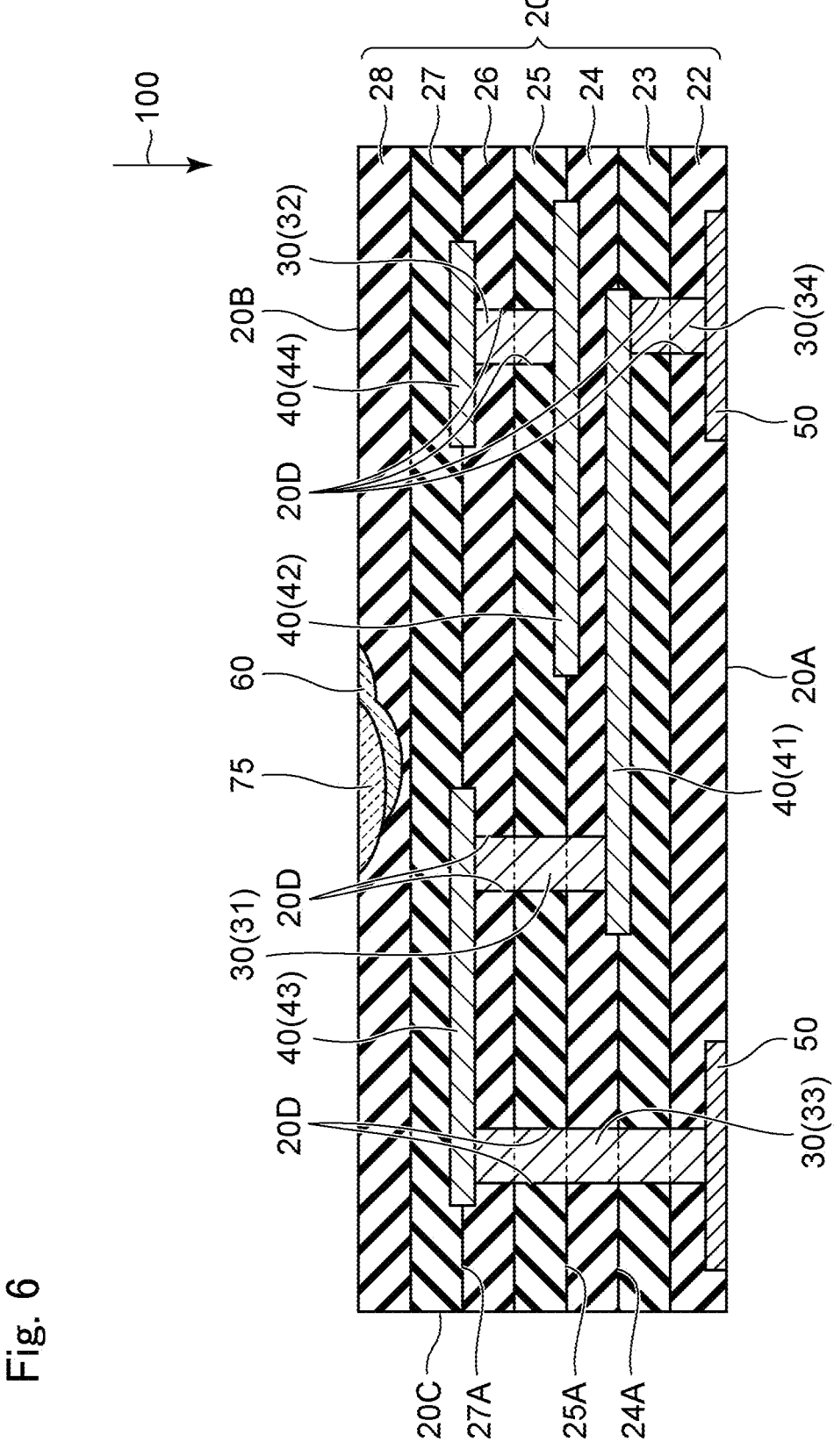
FIG. 6 is a cross-sectional view when a plurality of the base materials are laminated to form an element body in the method of manufacturing an electronic component according to the embodiment of the present disclosure.

Method of Manufacturing Electronic Component According to Present Embodiment Hereinafter, a method of manufacturing the electronic component 10 according to the present embodiment will be described with reference to FIGS. 3 to 6. FIG. 3 is a cross-sectional view when an interlayer connection conductor is formed on a base material in a method of manufacturing an electronic component according to the embodiment of the present disclosure. FIG. 4 is a cross-sectional view when an internal electrode is printed on the base material in the method of manufacturing an electronic component according to the embodiment of the present disclosure. FIG. 5 is a cross-sectional view illustrating a process in which an identification mark is printed on the base material in the method of manufacturing an electronic component according to the embodiment of the present disclosure. FIG. 6 is a cross-sectional view when a plurality of the base materials are laminated to form an element body in the method of manufacturing an electronic component according to the embodiment of the present disclosure.

The electronic component 10 is manufactured by segmenting a laminate into a plurality of the element bodies 20. The laminate is formed by integrating the plurality of element bodies 20 in an arranged state. In FIGS. 3 to 6, for convenience of description, only a portion corresponding to one element body 20 of the laminate is illustrated. A method of manufacturing the electronic component 10 according to the present embodiment includes a sheet forming step, an interlayer connection conductor forming step, an electrode forming step, an identification mark forming step, an element body forming step, a segmentation step, a firing step, and a plating layer forming step.

(Sheet Forming Step)

First, the sheet forming step is executed. In the sheet forming step, the base materials 22 to 28 illustrated in FIG. 2 are individually formed. In the base materials 22 to 28 formed in the sheet forming step, raw materials including a main material, a plasticizer, a binder, and the like corresponding to each of the base materials 22 to 28 are mixed to prepare a slurry constituting each of the base materials 22 to 28. Each of the base materials 22 to 28 at this stage is a green sheet composed of a slurry.

For each of the base materials 22 to 28, for example, a sinterable ceramic powder or the like is used as the main material. As the plasticizer, for example, phthalic acid ester, di-n-butyl phthalate, or the like is used. As the binder, for example, an acrylic resin, polyvinyl butyral, or the like is used.

The slurry constituting each of the base materials 22 to 28 is formed into a sheet shape on a carrier film 71 illustrated in FIG. 3 using, for example, a lip coater, a doctor blade, or the like. That is, each of the seven base materials 22 to 28 is formed on each of the seven carrier films 71. As the carrier film 71, for example, a polyethylene terephthalate (PET) film or the like is used. A thickness of each of the base materials 22 to 28 is, for example, 5 to 100 ($\mu$m).

In FIG. 3, the carrier film 71 and the base material 22 formed on the carrier film 71 are illustrated.

Next, the through hole 20D extending through each of the base materials 22 to 28 and the carrier film 71 in the thickness direction is formed.

Note that in FIG. 3, two through holes 20D are formed in the base material 22 and the carrier film 71, but the number of through holes 20D formed in each of the base materials 22 to 28 is not limited to two. Furthermore, the number of through holes 20D formed in each of the seven base materials 22 to 28 and each of the carrier films 71 may be the same or different. Furthermore, furthermore, the number of through holes 20D formed in each of the seven base materials 22 to 28 and each of the carrier films 71 may be the same position or different positions.

In the method of manufacturing the electronic component 10 according to the present embodiment, the number and positions of the through holes 20D formed in each of the seven base materials 22 to 28 and each of the carrier films 71 are determined so that the element body 20 as illustrated in FIG. 2 is finally formed.

(Interlayer Connection Conductor Forming Step)

Next, the interlayer connection conductor forming step is executed. In the interlayer connection conductor forming step, a conductive paste 72 is filled in the through hole 20D formed in each of the base materials 22 to 28 and each of the carrier films 71 in the sheet forming step (see FIG. 3).

The paste 72 is prepared, for example, by mixing raw materials containing a conductive powder, a plasticizer, and a binder.

(Electrode Forming Step)

Next, the electrode forming step is executed. In the electrode forming step, the external electrode 50 and the internal electrode 40 are formed.

In the method of manufacturing the electronic component 10 according to the present embodiment, for example, as illustrated in FIG. 4, a paste 73 corresponding to the internal electrode 41 is formed on the principal surface 24A of the base material 24. The paste 73 is formed by, for example, screen printing, inkjet printing, gravure printing, or the like. Note that the internal electrodes 42 to 44 and the external electrodes 50 are also formed on each of the base materials 22, 25, and 27 in the same manner as the internal electrode 41.

Similarly to the paste 72 described above, the paste 73 is prepared by mainly mixing raw materials containing a conductive powder, a plasticizer, and a binder. Note that the paste 73 may be made of the same raw material as the paste 72, or may be made of a raw material different from the paste 72.

(Identification Mark Forming Step)

Next, the identification mark forming step is executed. The identification mark forming step includes a first printing step and a second printing step.

The method of manufacturing the electronic component 10 according to the present embodiment includes a first printing step of printing an identification mark on a principal surface of a mark printing target base material, which is one of the plurality of base materials, and a second printing step of printing a non-sinterable paste on a partial region of the identification mark or on a region over both a part of the principal surface of the mark printing target base material and a part of the identification mark.

Hereinafter, the identification mark forming step will be described with reference to FIG. 5. In FIG. 5, the identification mark forming process is illustrated in two stages. The upper side of the paper surface of FIG. 5 is a first stage, and the lower side of the paper surface of FIG. 5 is a second stage.

In the first stage, a paste 74 corresponding to the identification mark 60 is formed on the principal surface 20B of the base material 28. The base material 28 is an example of a mark printing target base material. The paste 74 is formed by, for example, screen printing, inkjet printing, gravure printing, or the like. The paste 74 is made of a material constituting the identification mark 60 described above. In this step, the paste 75 is formed of ceramic in a paste form. As described above, in the first stage, the identification mark 60 is printed on the principal surface 20B of the base material 28. The first stage corresponds to the first printing step of the identification mark forming step.

In the second stage executed next, a paste 75 is formed on the principal surface 20B of the base material 28. As the material of the paste 75, a material that burns out during firing described later is used. In this step, the material of the paste 75 is a non-sinterable resin. Similarly to the paste 74, the paste 75 is formed by, for example, screen printing, inkjet printing, gravure printing, or the like.

The paste 75 is formed on a region over both a part of the principal surface 20B of the base material 28 and a part of the paste 74 formed in the first stage. As described above, in the second stage, the non-sinterable paste 75 is printed on the region. The second stage corresponds to the second printing step of the identification mark forming step.

Figure 10:
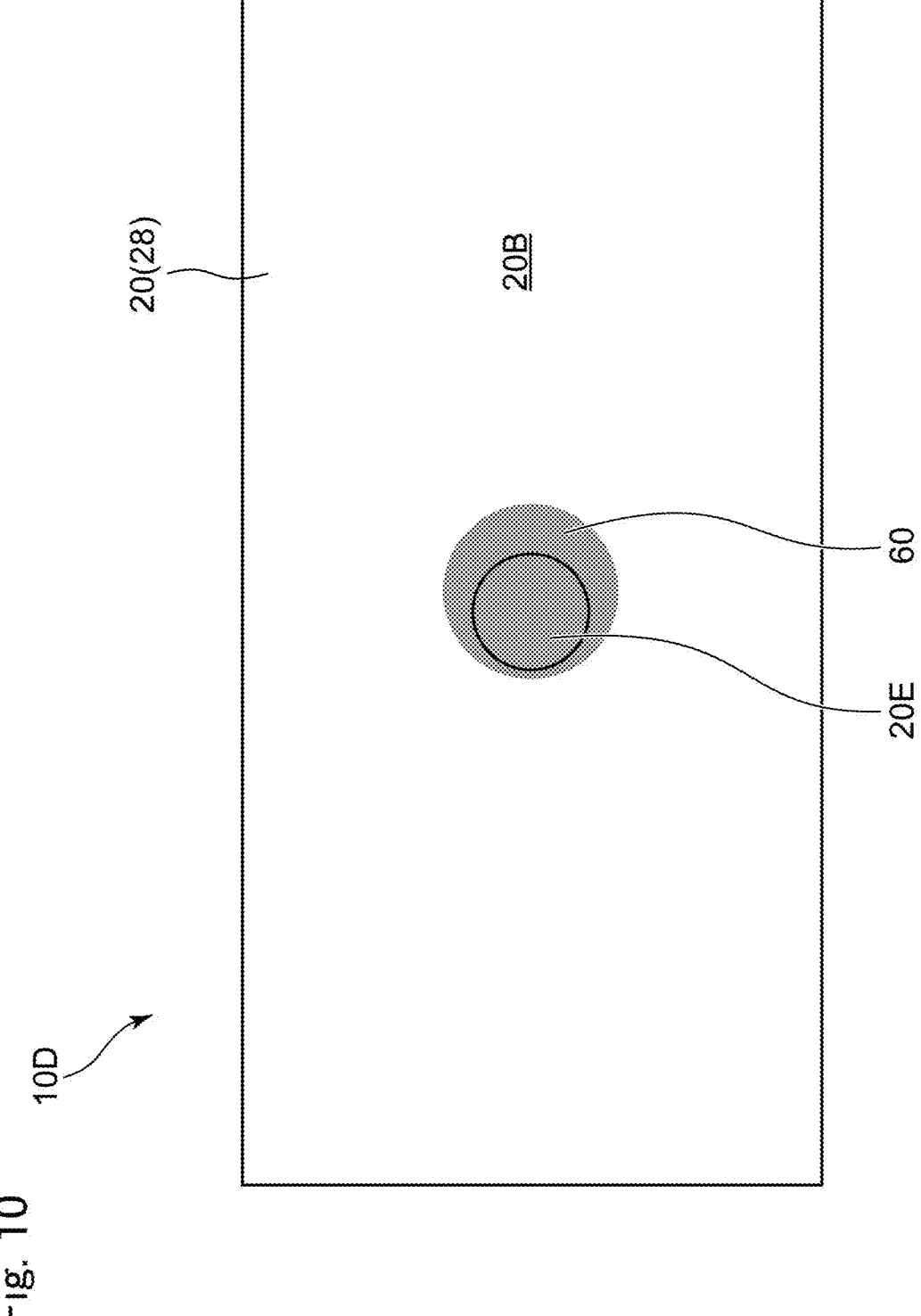
FIG. 10 is a plan view of an electronic component according to a fourth modification of the embodiment of the present disclosure.

The paste 75 serves as a base of the recess 20E of the element body 20. Therefore, the paste 75 is printed in a region corresponding to the recess 20E in the principal surface 20B of the base material 28. For example, in the case of forming the recess 20E as illustrated in FIG. 1, the paste 75 is formed on a region over both a part of the principal surface 20B of the base material 28 and a part of the identification mark 60 as described above. Furthermore, for example, in the case of forming the recess 20E as illustrated in FIG. 10 described later, the entire paste 75 is formed on a partial region of the identification mark 60.

(Element Body Forming Step)

Next, the element body forming step is executed. The method of manufacturing the electronic component 10 according to the present embodiment includes the element body forming step of forming an element body by laminating the plurality of base materials so that a principal surface of the mark printing target base material is exposed and the identification mark and the resin paste enter the mark printing target base material.

In the element body forming step, as illustrated in FIG. 6, the base materials 22 to 28 excluding the carrier films 71 are laminated and pressure-bonded in a mold. As a result, the element body 20 is obtained.

In the element body forming step, the seven base materials 22 to 28 are laminated in the order from the base material with a small reference numeral to the base material with a large reference numeral, specifically, in the order of the base materials 22, 23, 24, 25, 26, 27, and 28. As a result, the principal surface 20A of the base material 22 and the principal surface 20B of the base material 28 become outer surfaces of the element body 20. That is, in the element body forming step, the plurality of base materials 22 to 28 is laminated on each other such that the principal surface 20B of the base material 28 is exposed.

In the element body forming step, each of the base materials 22 to 28 is pressure-bonded, whereby the external electrode 50 enters the base material 22, and the identification mark 60 and the paste 75 enter the base material 28. That is, in the element body forming step, the plurality of base materials 22 to 28 is laminated on each other such that the identification mark 60 and the paste 75 enter the base material 28.

(Segmentation Step)

Next, a segmentation step is performed. In the segmentation step, the laminate in which the plurality of element bodies 20 are arranged is cut into the plurality of element bodies 20. For cutting the laminate, for example, a dicing saw, a guillotine cutter, a laser, or the like is used. After the laminate is cut, the corner portion and the edge portion of the element body 20 may be polished by, for example, barrel processing or the like. Note that the polishing may be executed after the firing step.

(Firing Step)

Next, the firing step is executed. The method of manufacturing the electronic component 10 according to the present embodiment includes the firing step of firing the element body to remove the resin paste.

In the firing step, the element body 20 is fired. As a result, each of the base materials 22 to 28 constituting the element body 20 is cured. That is, each of the base materials 22 to 28, which is a flexible green sheet, is cured and changed into a substrate.

Furthermore, the paste 75 is burned out by firing the element body 20. As a result, the recess 20E is formed in the portion where the paste 75 existed (see FIG. 2).

The method of forming the recess 20E is not limited to the method of burning out the paste 75 as described above. For example, the recess 20E may be formed in the element body 20 by pressing the element body 20 with a mold including a protrusion.

(Plating Layer Forming Step)

Next, the plating layer forming step is executed. In the plating layer laminating step, the external electrode 50 is subjected to a known plating treatment. As a result, as illustrated in FIG. 2, the plating layer 55 is formed so as to completely cover the external electrode 50.

Note that the plating layer 55 may be formed so as to cover only a part of the external electrode 50. Furthermore, in addition to the external electrode 50, the plating layer 55 may be formed so as to cover the principal surface 20A around the external electrode 50.

According to this manufacturing method, the paste 75 that has entered the base material 28 in the element body forming step is removed by the firing step. As a result, the recess 20E can be formed in a region including at least a part of the identification mark 60 on the principal surface 20B of the base material 28.

Modifications of Embodiment

In the electronic component 10 according to the embodiment described above, the identification mark 60 and the recess 20E are both circular (the same shape) and have the same size when viewed from the orthogonal direction 100. Furthermore, when viewed from the orthogonal direction 100, a part of the identification mark 60 and a part of the recess 20E overlap each other. However, the identification mark 60 and the recess 20E are not limited to the above-described configurations. Hereinafter, modifications of the electronic component 10 according to the embodiment will be described.

First Modification

Figure 7:
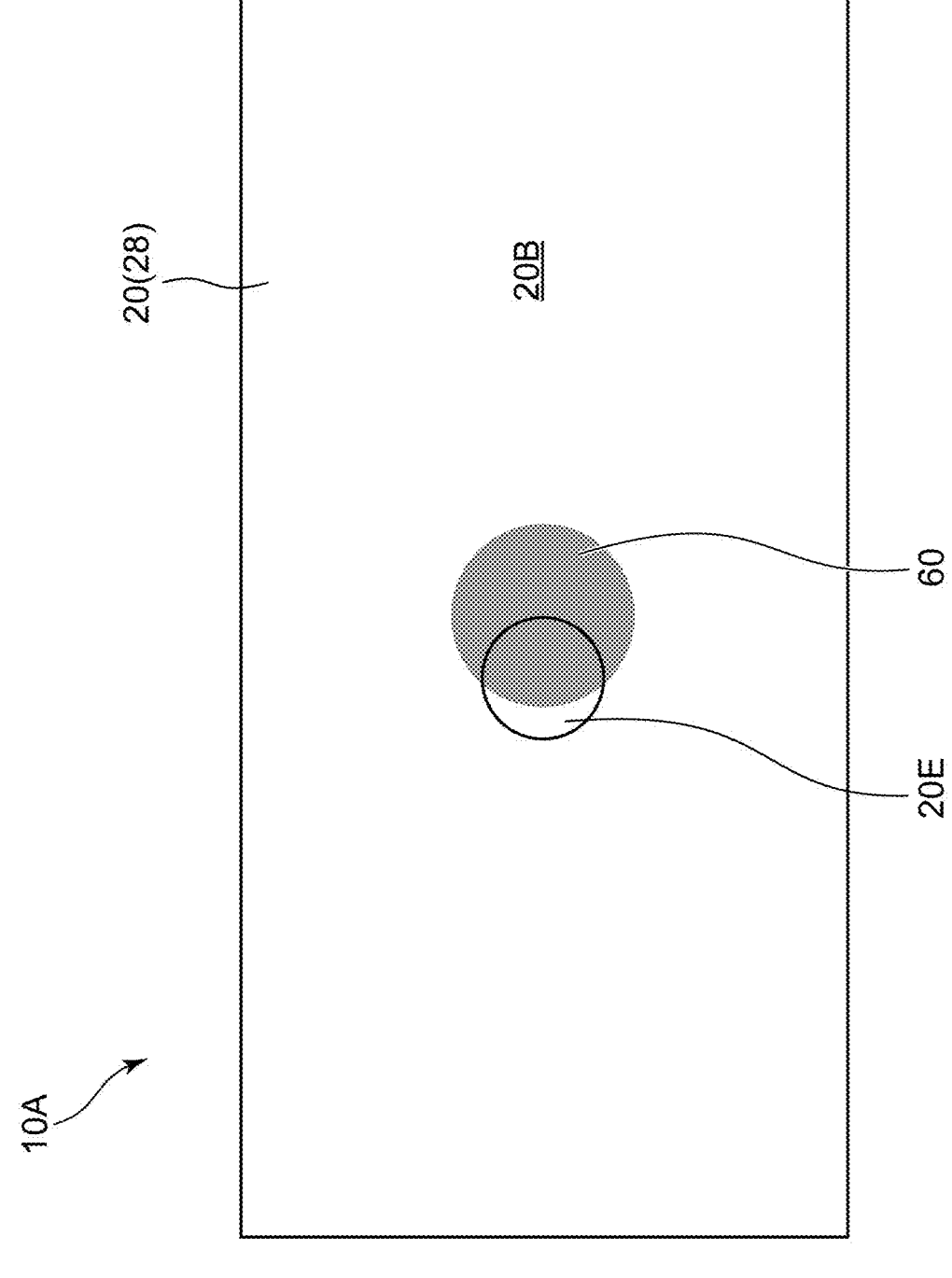
FIG. 7 is a plan view of an electronic component according to a first modification of the embodiment of the present disclosure.

FIG. 7 is a plan view of an electronic component according to a first modification of the embodiment of the present disclosure. The identification mark 60 may have a size different from that of the recess 20E. For example, as illustrated in FIG. 7, in an electronic component 10A according to the first modification, the identification mark 60 and the recess 20E are both circular and have the same shape when viewed from the orthogonal direction 100, but the recess 20E is smaller than the identification mark 60. Note that contrary to the above, the recess 20E may be larger than the identification mark 60.

Second and Third Modifications

Figure 8:
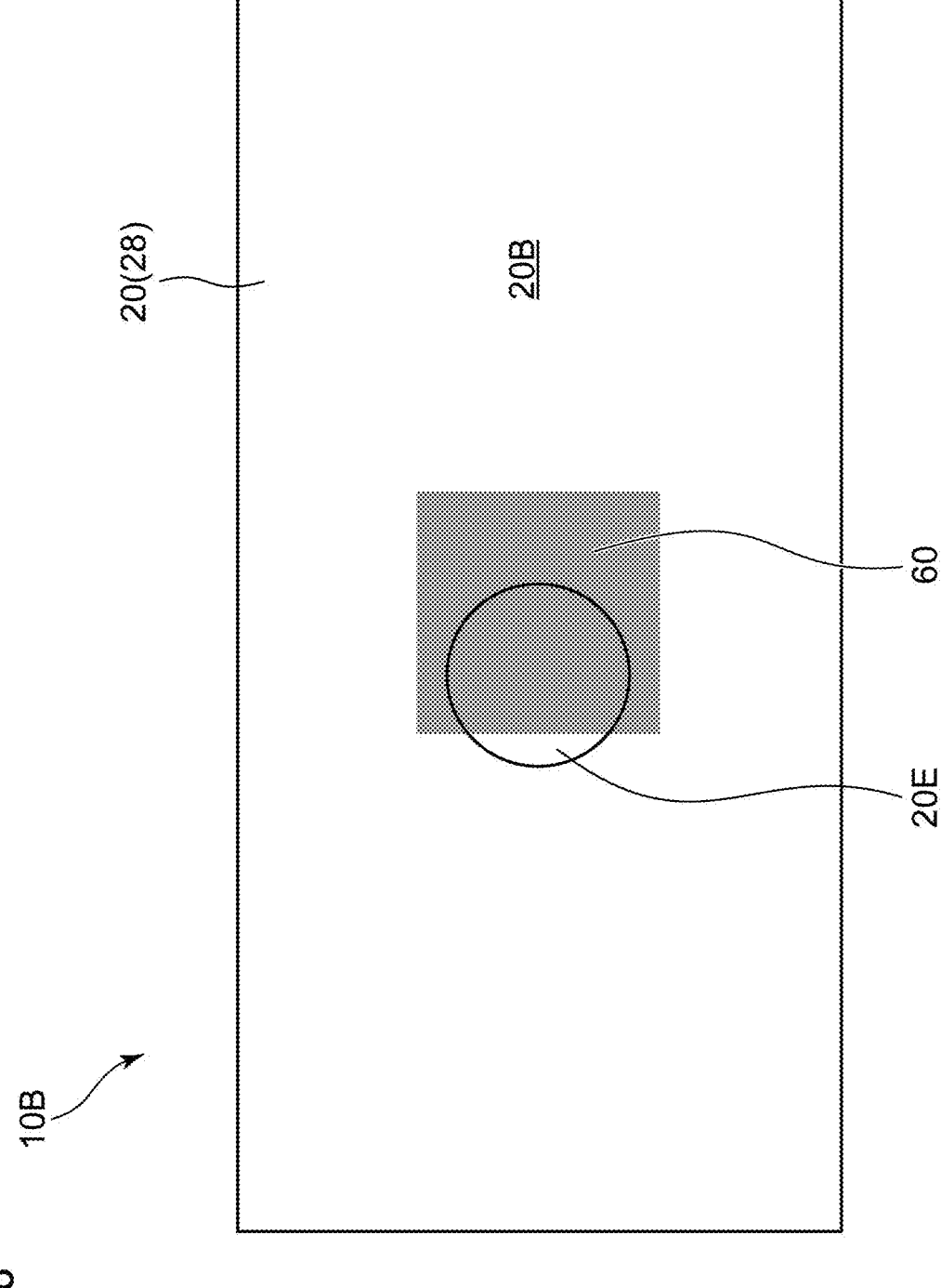
FIG. 8 is a plan view of an electronic component according to a second modification of the embodiment of the present disclosure.
Figure 9:
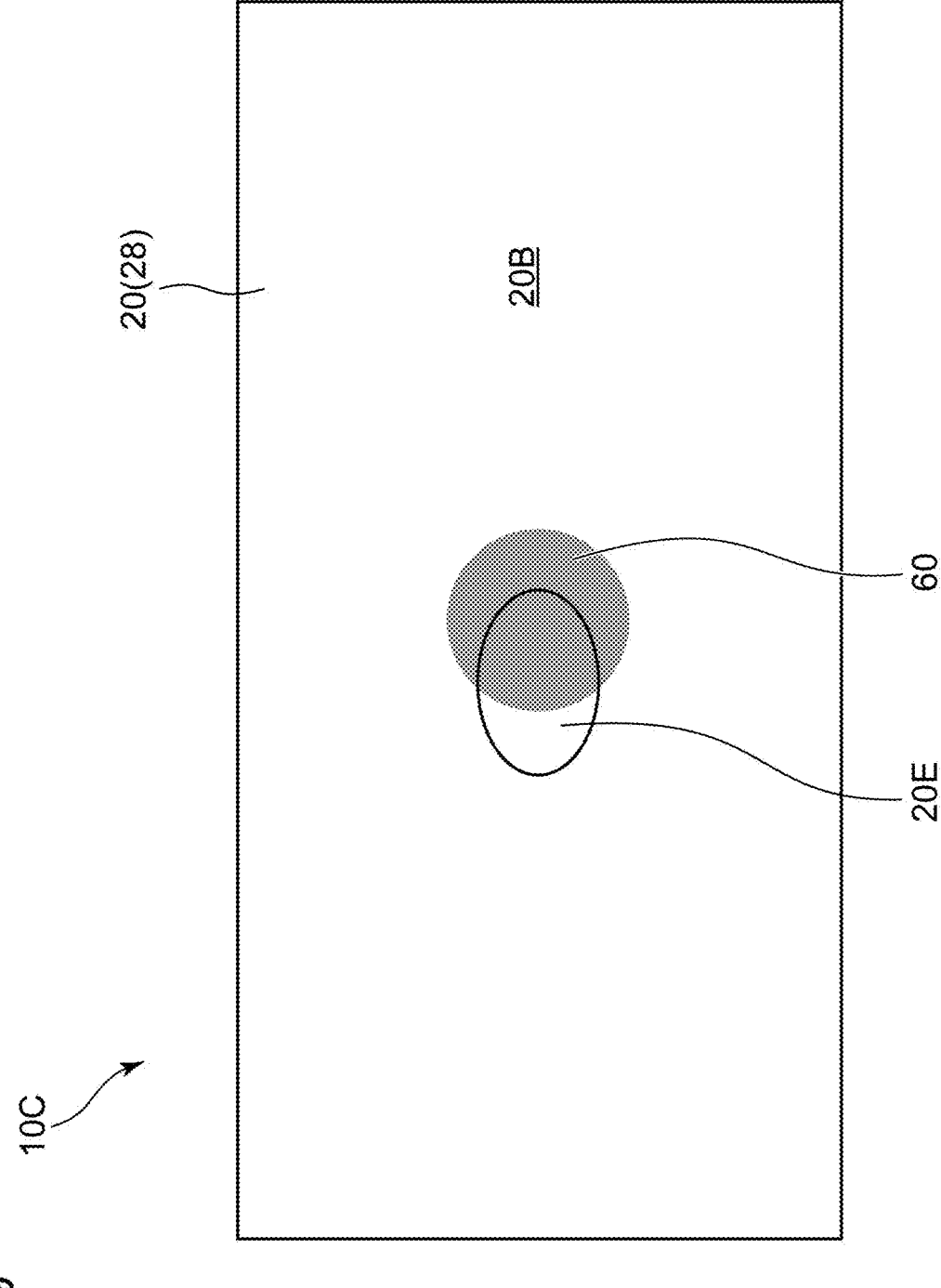
FIG. 9 is a plan view of an electronic component according to a third modification of the embodiment of the present disclosure.

FIG. 8 is a plan view of an electronic component according to a second modification of the embodiment of the present disclosure. FIG. 9 is a plan view of an electronic component according to a third modification of the embodiment of the present disclosure. The identification mark 60 and the recess 20E may have different shapes. For example, as illustrated in FIG. 8, in an electronic component 10B according to the second modification, the identification mark 60 has a quadrangular shape while the recess 20E has a circular shape when viewed from the orthogonal direction 100. Furthermore, for example, as illustrated in FIG. 9, in an electronic component 10C according to the third modification, when viewed from the orthogonal direction 100, the identification mark 60 has a circular shape, while the recess 20E has an elliptical shape.

According to this modifications, compared to the configuration in which the shape of the identification mark 60 and the shape of the recess 20E are the same when viewed from the orthogonal direction 100, it is possible to clarify a difference between the portion formed in the recess 20E and the portion formed in a portion other than the recess 20E in the identification mark 60. Accordingly, the visibility of the identification mark 60 can be enhanced.

Fourth Modification

FIG. 10 is a plan view of an electronic component according to a fourth modification of the embodiment of the present disclosure.

As illustrated in FIG. 1, in the electronic component 10 described above, when viewed from the orthogonal direction 100, the recess 20E of the element body 20 is formed across a portion of the principal surface 20B of the element body 20 where the identification mark 60 is formed and a portion of the principal surface 20B of the element body 20 where the identification mark 60 is not formed.

On the other hand, as illustrated in FIG. 10, in an electronic component 10D according to the second modification, the entire recess 20E of the element body 20 is formed in the portion where the identification mark 60 is formed in the principal surface 20B of the element body 20. That is, in the electronic component 10D, the recess 20E of the element body 20 is formed only in the portion where the identification mark 60 is formed in the principal surface 20B of the element body 20. Furthermore, in the electronic component 10D, the recess 20E of the element body 20 occupies a part of the identification mark 60. That is, the identification mark 60 includes a portion formed in the recess 20E in the principal surface 20B of the element body 20 and a portion formed in a portion other than the recess 20E in the principal surface 20B of the element body 20.

According to this modification, the recess 20E is not formed outside the identification mark 60. As a result, in the electronic component, the portion for forming the identification mark 60 and the portion for forming the recess 20E can be made common. Therefore, the electronic component 10 can be downsized.

Fifth Modification

Figure 11:
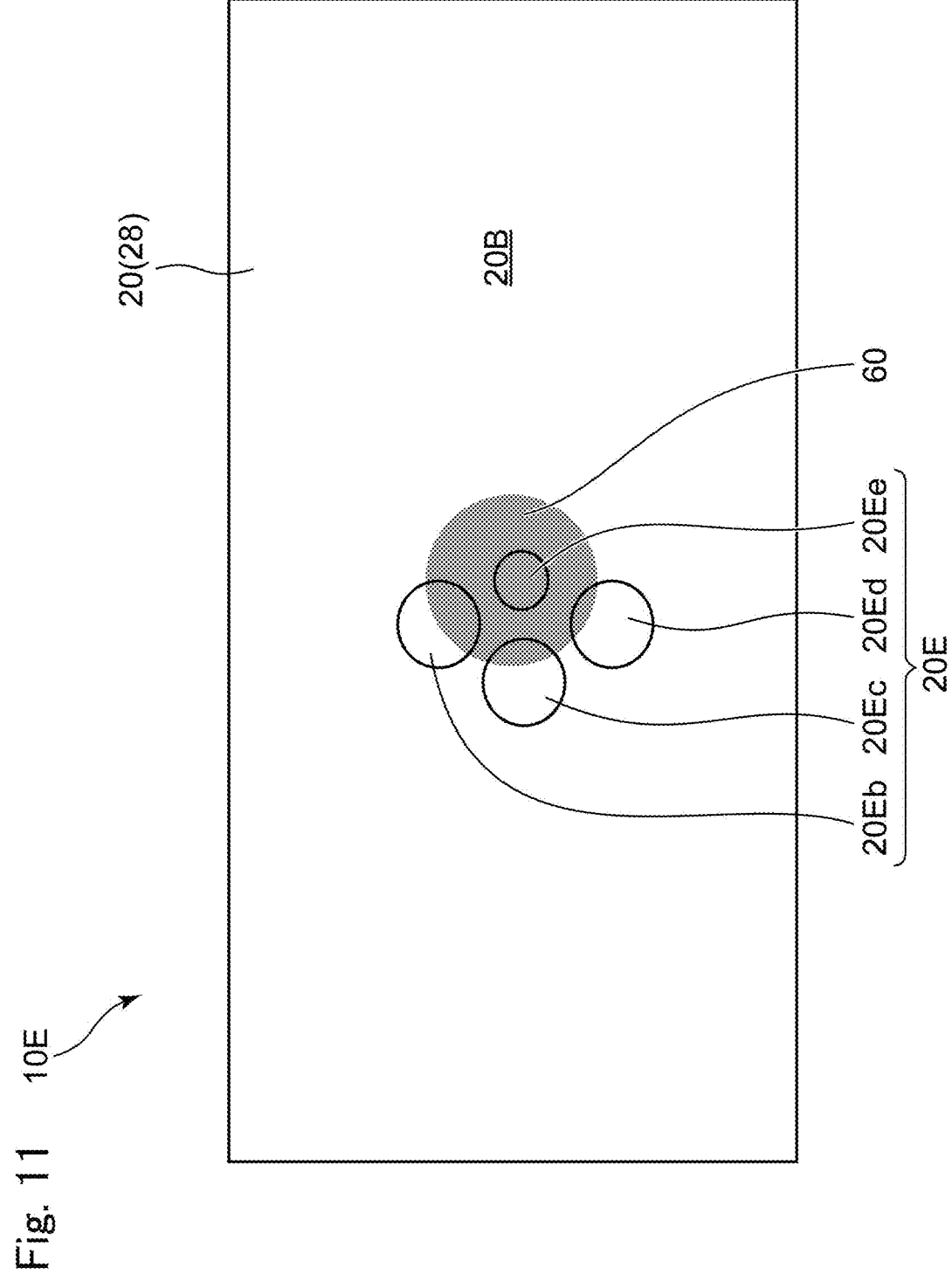
FIG. 11 is a plan view of an electronic component according to a fifth modification of the embodiment of the present disclosure.

FIG. 11 is a plan view of an electronic component according to a fifth modification of the embodiment of the present disclosure. In an electronic component 10E according to the fifth modification, a plurality of the recesses 20E are formed in the principal surface 20B of the element body 20. As illustrated in FIG. 11, in the electronic component 10E, four recesses 20Eb, 20Ec, 20Ed, and 20Ee are formed in the principal surface 20B of the element body 20. When viewed from the orthogonal direction 100, a part of each of the recesses 20Eb, 20Ec, and 20Ed overlaps with the identification mark 60. When viewed from the orthogonal direction 100, the entire recess 20Ee overlaps with the identification mark 60.

Note that the number of recesses 20E is not limited to four. The shape of the plurality of recesses 20E is not limited to a circular shape. The sizes of the respective recesses 20E may be the same or different from each other. In FIG. 11, when viewed from the orthogonal direction 100, a part of each of the three recesses 20Eb, 20Ec, and 20Ed partially overlaps the identification mark 60, and the entire recess 20Ee overlaps the identification mark 60, but the present disclosure is not limited thereto. For example, when viewed from the orthogonal direction 100, all of the plurality of recesses 20E may partially overlap the identification mark 60. Furthermore, for example, when viewed from the orthogonal direction 100, all of the plurality of recesses 20E may be formed in the identification mark 60.

When light is applied to the identification mark 60, the position corresponding to the recess 20E in the identification mark 60 looks darker than the position corresponding to the portion other than the recess 20E in the identification mark 60. According to this modification, the plurality of recesses 20E is formed in the principal surface 20B of the element body 20. Therefore, a plurality of dark places in the identification mark 60 is formed. As a result, a large number of light-dark boundary portions can be formed in the identification mark 60. As a result, the visibility of the identification mark 60 can be enhanced.

Sixth and Seventh Modifications

Figure 12:
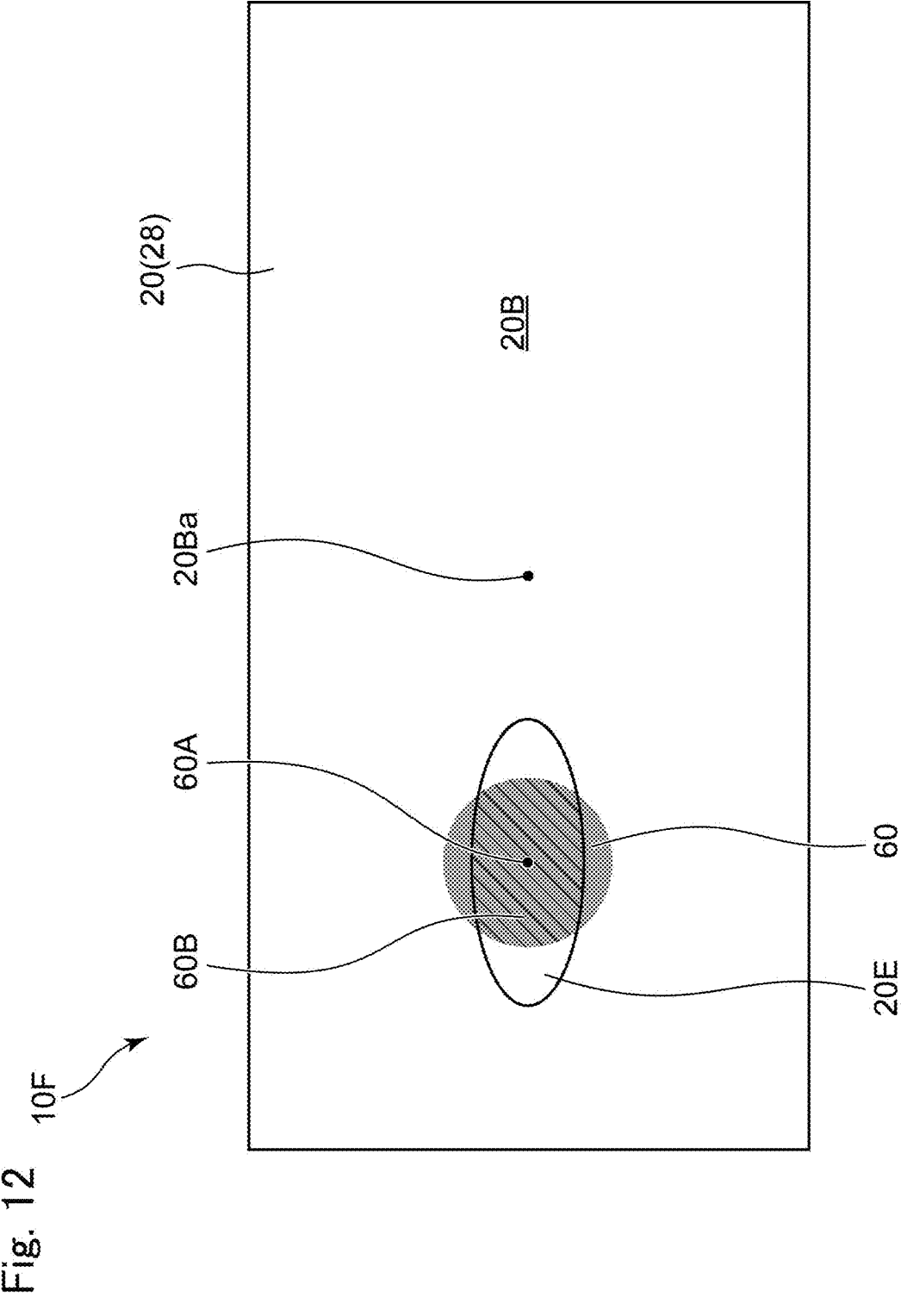
FIG. 12 is a plan view of an electronic component according to a sixth modification of the embodiment of the present disclosure.
Figure 13:
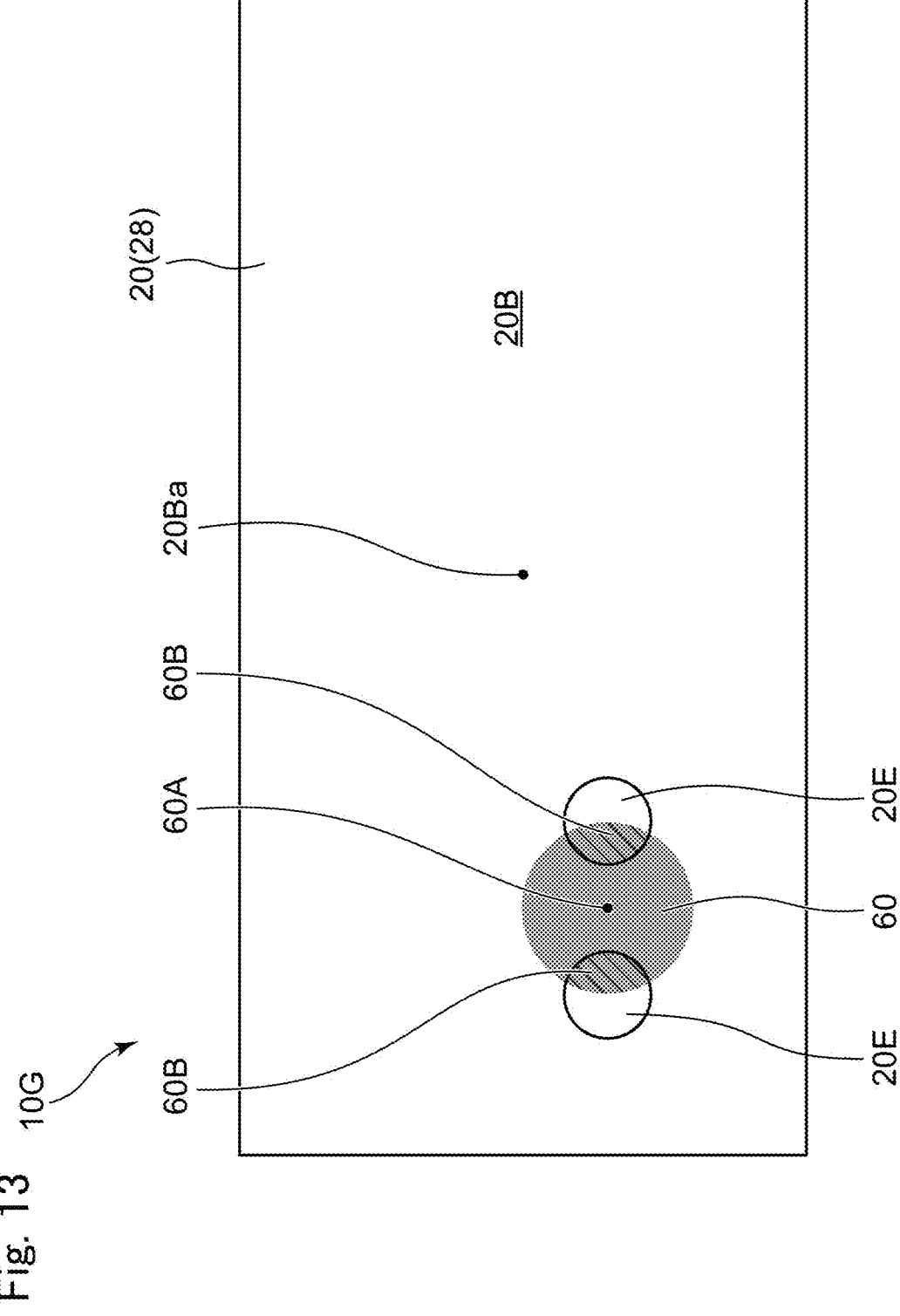
FIG. 13 is a plan view of an electronic component according to a seventh modification of the embodiment of the present disclosure.

FIG. 12 is a plan view of an electronic component according to a sixth modification of the embodiment of the present disclosure. FIG. 13 is a plan view of an electronic component according to a seventh modification of the embodiment of the present disclosure.

As illustrated in FIG. 1, in the electronic component 10 described above, when viewed from the orthogonal direction 100, the overlapping portion 60B (a hatched portion in FIG. 1) formed in the recess 20E of the identification mark 60 is asymmetric with respect to the center point 60A of rotational symmetry of the identification mark 60.

On the other hand, as illustrated in FIGS. 12 and 13, in an electronic component 10F according to the sixth modification and an electronic component 10G according to the seventh modification, when viewed from the orthogonal direction 100, the overlapping portion 60B (hatched portion in FIGS. 12 and 13) formed in the recess 20E of the identification mark 60 is symmetric with respect to the center point 60A of rotational symmetry of the identification mark 60.

In this case, as illustrated in FIGS. 12 and 13, the identification mark 60 is formed such that the center point 60A of the rotational symmetry of the identification mark 60 is at a position different from the center point 20Ba of the rotational symmetry of the principal surface 20B of the element body 20 when viewed from the orthogonal direction 100, whereby the direction of the electronic component 10 can be determined based on the position of the identification mark 60. Furthermore, when light is applied to the identification mark 60, the overlapping portion 60B formed in the recess 20E of the identification mark 60 looks darker than other portions of the identification mark 60. Accordingly, the visibility of the identification mark 60 can be enhanced.

Note that in the configurations other than the sixth and seventh modifications, the identification mark 60 may be formed such that the center point 60A of the rotational symmetry of the identification mark 60 is located at a position different from the center point 20Ba of the rotational symmetry of the principal surface 20B of the element body 20 when viewed from the orthogonal direction 100.

Note that by appropriately combining arbitrary embodiment and modifications among the various embodiment and modifications described above, the effects of the respective embodiment and modifications can be achieved.

Although the present disclosure has been fully described in connection with the preferred embodiment thereof with reference to the drawings as appropriate, it is to be noted that various changes and modifications are apparent to those skilled in the art. Such changes and modifications are to be understood as included within the scope of the present disclosure as defined by the appended claims unless they depart therefrom.

10 electronic component
20 element body
20B principal surface (outer surface)
20E recess
60 identification mark

What is claimed is:

1. An electronic component comprising:
an element body; and
a mark provided on an outer surface of the element body,
wherein at least one recess is provided on the outer surface of the element body,
the mark comprising:
    a first portion overlapping the recess when viewed from an orthogonal direction orthogonal to the outer surface of the element body; and
    a second portion directly contacting the first portion and positioned at a location offset from the recess when viewed from the orthogonal direction;
wherein the entire area of the mark is exposed to the outside when viewed from the orthogonal direction; and
wherein when viewed from the orthogonal direction, a center point of the first portion and a center point of the mark are located at different positions.

2. The electronic component of claim 1, wherein a shape of the mark is different from a shape of the recess when viewed from the orthogonal direction.

3. The electronic component of claim 1, wherein when viewed from the orthogonal direction, the recess is provided across one portion where the mark is formed in the outer surface of the element body and another portion where the mark is not formed in the outer surface of the element body.

4. The electronic component of claim 1, wherein when viewed from the orthogonal direction, the recess is provided only in one portion where the mark is provided in the outer surface of the element body.

5. The electronic component of claim 1, wherein the at least one recess comprises a plurality of recesses.

6. The electronic component of claim 1, wherein a depth of the recess along the orthogonal direction is equal to or more than a thickness of the mark along the orthogonal direction.

7. The electronic component of claim 1, wherein the mark has a rotationally symmetric shape when viewed from the orthogonal direction, wherein the outer surface of the element body has a rotationally symmetric shape when viewed from the orthogonal direction, and wherein a center point of a rotational symmetry of the mark coincides or substantially coincides with a center point of a rotational symmetry of the outer surface of the element body when viewed from the orthogonal direction.

8. The electronic component of claim 1, wherein the element body comprises ceramic.

9. The electronic component of claim 2, wherein when viewed from the orthogonal direction, the recess is provided across one portion where the mark is formed in the outer surface of the element body and another portion where the mark is not formed in the outer surface of the element body.

10. The electronic component of claim 2, wherein when viewed from the orthogonal direction, the recess is provided only in one portion where the mark is provided in the outer surface of the element body.

\* \* \* \* \*